United States Patent
Antsfeld

(10) Patent No.: US 8,072,496 B2
(45) Date of Patent: Dec. 6, 2011

(54) MOTION SMOOTHING IN VIDEO STABILIZATION

(75) Inventor: Leonid Antsfeld, Nesher (IL)

(73) Assignee: Intel Corporation, Santa Clara, CA (US)

(*) Notice: Subject to any disclaimer, the term of this patent is extended or adjusted under 35 U.S.C. 154(b) by 524 days.

(21) Appl. No.: 12/286,470

(22) Filed: Sep. 29, 2008

(65) Prior Publication Data

US 2010/0079603 A1 Apr. 1, 2010

(51) Int. Cl.
*H04N 5/228* (2006.01)

(52) U.S. Cl. ................. 348/208.1; 348/208.6

(58) Field of Classification Search ........... 386/269, 386/264; 348/241, 606, 607, 618, 619, 208.99, 348/208.1, 208.6; 382/260, 264, 261
See application file for complete search history.

(56) References Cited

U.S. PATENT DOCUMENTS

| | | | | |
|---|---|---|---|---|
| 6,236,705 | B1* | 5/2001 | Stergiopoulos et al. | 378/8 |
| 6,535,570 | B2* | 3/2003 | Stergiopoulos et al. | 378/8 |
| 6,693,713 | B1* | 2/2004 | Nakajima | 356/400 |
| 7,663,750 | B2* | 2/2010 | Bahatt et al. | 356/328 |
| 7,817,273 | B2* | 10/2010 | Bahatt et al. | 356/328 |
| 2002/0025017 | A1* | 2/2002 | Stergiopoulos et al. | 378/8 |
| 2007/0035818 | A1* | 2/2007 | Bahatt et al. | 359/366 |
| 2007/0035819 | A1* | 2/2007 | Bahatt et al. | 359/366 |
| 2007/0213889 | A1* | 9/2007 | Parra Carque | 701/7 |
| 2008/0112630 | A1 | 5/2008 | Nestares et al. | |
| 2008/0235312 | A1* | 9/2008 | Mintzlaff | 708/400 |
| 2009/0257634 | A1* | 10/2009 | Moeller et al. | 382/131 |
| 2010/0039642 | A1* | 2/2010 | Bahatt et al. | 356/328 |

OTHER PUBLICATIONS

"A motion model based video stabilisation algorithm", World Automation Congress, Tsoligka et al, Jul. 2006.*
Schoonderwaldt, Erwin et al., Combining accelerometer and video camera: Reconstruction of bow velocity profiles, Proceedings of the International Conference on New Interfaces for Musical Expression (NIME06), 2006.
Krumm, John, "Savitzky-Golay Filters for 2D Images", Aug. 2001, Web Page available at: http://research.microsoft.com/en-us/um/people/jckrumm/savgol/savgol.htm.
Sarp Erturk, "Real-Time Digital Image Stabilization Using Kalman Filters", Real-Time Imaging 8, 317-328 (2002).
Tsoligkas, N.A. et al., "A Motion Model Based Video Stabilisation Algorithm", World Automation Congress (WAC), Budapest, Hungary, Jul. 24-26, 2006, 6 Pages.
Office Action Received for European Patent Application No. 09252304.2, mailed on Feb. 15, 2010, 3 Pages.
Savitzky et al., "Smoothing and Differentiation of Data by Simplified Least Squares Procedures", Analytical Chemistry, Jul. 1964, vol. 36, No. 8, pp. 1627-1639.
Matsushita et al., "Full-frame video stabilization with motion inpainting", Pattern Analysis and Machine Intelligence, IEEE Transactions on Pattern Analysis and Machine Intelligence, vol. 28, No. 7, Jul. 2006, pp. 1150-1163.
Press et al., "Numerical Recipes in C: The Art of Scientific Computing", Second Edition, Chapter 14, Statistical Description of Data, §14.8 Savitzky-Golay Smoothing Filters, 1989, pp. 650-655.

(Continued)

*Primary Examiner* — Nicholas Giles
(74) *Attorney, Agent, or Firm* — Glen B Choi

(57) ABSTRACT

A motion stabilizing techniques are described. A frame of video is represented at least by frame position information. Savitzky-Golay filtering may be applied on frame position information. The resulting filtered video may have reduced visible jitteriness.

15 Claims, 3 Drawing Sheets

OTHER PUBLICATIONS

Chan et al., "Aspects of Total Variation Regularized L1 Function Approximation", Society for Industrial and Applied Mathematics, Journal on Applied Mathematics, vol. 65, No. 5, Jul. 26, 2005, pp. 1817-1837.

Chan et al., "Recent Developments in Total Variation Image Restoration", Mathematical Models of Computer Vision, 2005, pp. 1-18.

Madden, "Comments on the Savitzky-Golay Convolution Method for Least-Squares Fit Smoothing and Differentiation of Digital Data", Analytical Chemistry, vol. 50, No. 9, Aug. 1978, pp. 1383-1386.

Office Action received for Chinese Patent Application No. 200910221455.5, mailed on May 17, 2011, 11 pages of Chinese Office Action including 6 pages of English Translation.

\* cited by examiner

☐ Noisy data
○ Filtered data

MOTION SMOOTHING IN VIDEO STABILIZATION

FIELD

The subject matter disclosed herein relates generally to the field of stabilizing video.

RELATED ART

Many types of mobile devices such as video cameras, still cameras in movie mode, and cameras in cellular telephones and personal digital assistants (PDAs) allow the capture of image sequences. In most cases, however, video is captured under non-ideal conditions and with non-ideal acquisition equipment. For example, in situations such as filming from a moving vehicle or using an unsteady hand, most videos show a high degree of unwanted motion or jitter. Even videos acquired in normal conditions show unwanted shaking. Video stabilization aims at removing undesired shaky motion from videos.

Although some of the most expensive devices provide mechanical image stabilization, image processing techniques are usually employed that typically involve calculating image motion based on pre-selected image regions within the image which are assumed to contain primarily background information. If an object of interest happens to be in this area, it violates the basic assumption, and the background motion estimation will be incorrect.

Other digital stabilization techniques involve estimating the motion across the entire image by integrating the image along the horizontal and vertical coordinates, respectively, and then calculating the motion by simple correlation of the two one-dimensional signals in consecutive frames. Such techniques are fast and can be implemented in hardware embedded within imaging devices, but tend to be inaccurate and may lead to biased motion estimates by calculating an average motion across all objects in the image.

Other common approaches to smooth the shakiness of the video include use of polynomial fitting, Gaussian convolution, and Kalman filtering.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Figure 1:
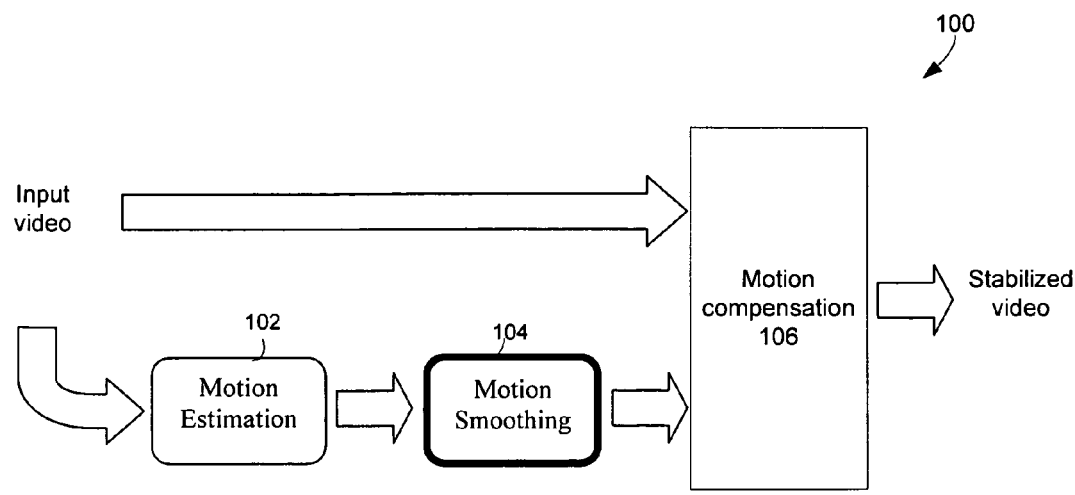
FIG. 1 depicts in high level block diagram form a video stabilization pipeline.

FIG. 1 depicts in high level block diagram form a video stabilization pipeline 100. Pipeline 100 includes motion estimation 102, motion smoothing 104, and motion compensation 106. Video stabilization pipeline 100 may be consistent with the H.264 (advanced video codec (AVC) and MPEG-4 Part 10) compression standard, for example. The H.264 standard has been prepared by the Joint Video Team (JVT), which includes ITU-T SG16 Q.6, also known as VCEG (Video Coding Expert Group), and the ISO-IEC JTC1/SC29/WG11 (2003), known as MPEG (Motion Picture Expert Group). Video stabilization pipeline 100 may be consistent with MPEG-2 (ISO/IEC (2000)) and VC1 (SMPTE 421M (2006)) as well as other video codecs.

Figure 2:
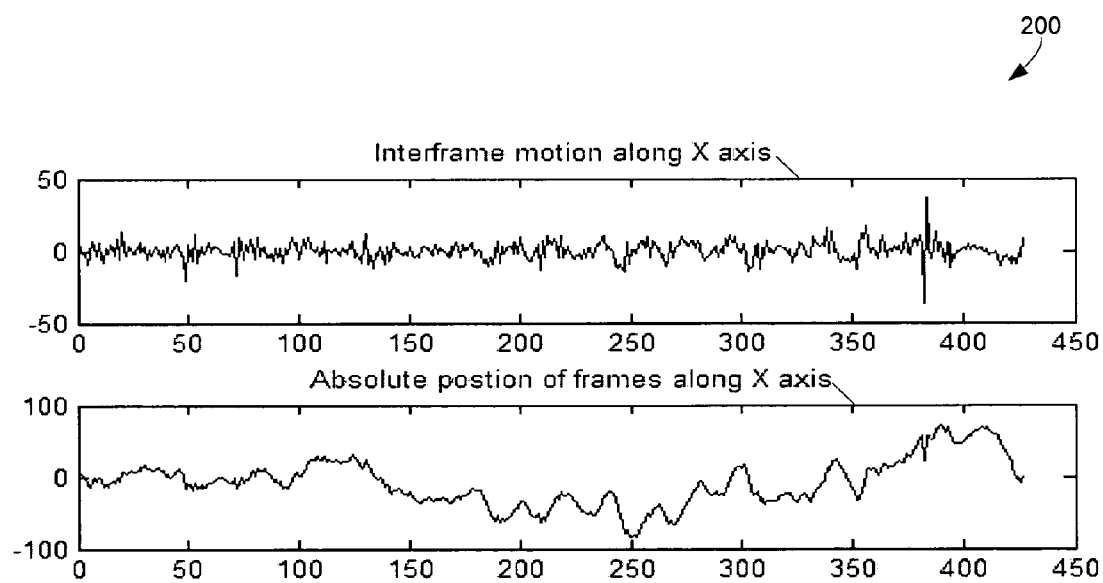
FIG. 2 depicts an example of an interframe motion vector and received absolute position along the X axis.

Motion estimation 102 may receive an input video stream for example from a stored file, video camera, and/or streaming video from a network. Motion estimation 102 may output interframe motion parameters. The number of the parameters may vary, depending on which motion estimation model is used. For example, a translation model may produce two parameters, specifically X and Y, which represent interframe movement along the X axis and Y axis, respectively. A rotation-translation-scale model may produce four parameters, representing interframe rotation, translation, and scaling. For example, FIG. 2 depicts an example of an interframe motion vector and received absolute position along the X axis from time 0 to time 450. The information represented by FIG. 2 can be output from motion estimation 102.

Referring again to FIG. 1, in one embodiment, motion smoothing 104 may use Savitzky-Golay filters to reduce the appearance of jitter in video. The Savitzky-Golay (SG) smoothing filter is a type of a FIR filter described in "Smoothing and Differentiation of Data by Simplified Least Squares Procedures," Savitzky A. and Golay, M. J. E. 1964, Analytical Chemistry, vol. 36, pp. 1627-1639. SG filtering may perform a local polynomial regression of degree k on a distribution of at least k+1 equally spaced points to determine the smoothed value for each point. SG filtering may replace each value of the obtained noisy data with a new value which is obtained from a polynomial fit of degree k to 2n+1 neighboring points in the least-squares sense, where k≤n. Once a polynomial order k and size of the window 2n+1 are determined, the weighted coefficients may be pre-calculated off-line and stored for future use. SG filtering may use a linear convolution with a set of pre-computed coefficients.

SG filters may preserve higher moments of the original spectrum. This may result in a maximum amount of noise being removed while preserving significant spectral characteristics of the data.

A modified Rudin-Osher-Fatemi function widely used for image restoration may be used to provide quantitative measure of smoothness quality.

$$F(u) = \int_D |\nabla u| dx + \lambda \int_D |f - u| dx \qquad \text{Eq. 1}$$

where
f(x) represents the observed noisy data,
u(x) represents the restored (smoothed) data, and
constant λ is a scale parameter.
A restored u(x) that minimizes F(u) can be used to determine the smoothest video.

The first integral of the functional regularization term, also known as Total Variation of u(x), imposes u(x) to be a smooth function. The regularization term disfavors oscillations and it is responsible for the elimination of noise. The second term, the fidelity term, encourages u(x) to be a good approximation to the observed data f(x). There may be a tradeoff between u(x) smoothness and approximation of u(x) to the original f(x).

Table 1 presents results of the proposed metric obtained by applying different smoothing techniques on video with jitter.

TABLE 1

Proposed metric results of different motion smoothing techniques

|  | Regularization Term | Fidelity Term | F(u) $\lambda = 1$ | F(u) $\lambda = 2$ | F(u) $\lambda = 3$ |
|---|---|---|---|---|---|
| Spline, k = 2 | 2.54 | 3.52 | 6.05 | 9.57 | 13.08 |
| Gaussian | 1.83 | 3.73 | 5.56 | 9.29 | 13.02 |
| Kalman | 3.15 | 3.57 | 6.72 | 10.29 | 13.86 |
| SG, k = 2, n = 7 | 2.38 | 3.03 | 5.40 | 8.43 | 11.46 |
| SG, k = 2, n = 5 | 2.57 | 2.41 | 4.98 | 7.39 | 9.79 |

For removing jitter from video, Savitzky-Golay smoothing filters may perform much better than standard averaging FIR filters. FIR filters may tend to filter out a significant portion of the data's high frequency content, thus smoothing the intended motion pattern along with a noise. It is important that the stabilization system preserves deliberate, long term camera movements, while removing only unwanted jittering.

Figure 3:
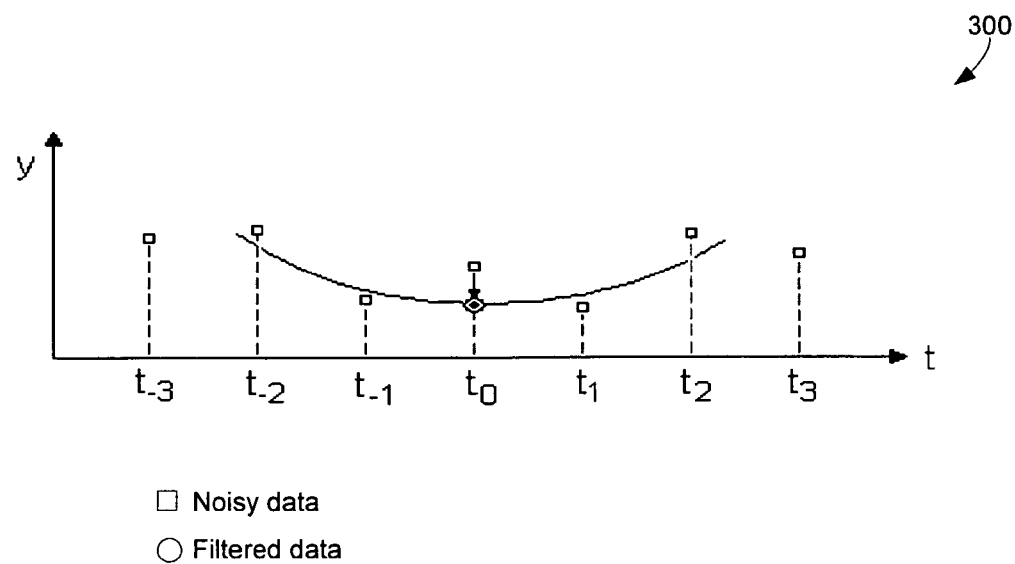
FIG. 3 depicts an example smoothing operation of an SG filter, in accordance with an embodiment of the present invention.

FIG. 3 depicts an example smoothing operation of an SG filter, in accordance with an embodiment of the present invention. The circle at time $t_0$ indicates the filtered data calculated as a central point of the fitted polynomial curve p(x).

Figure 4:
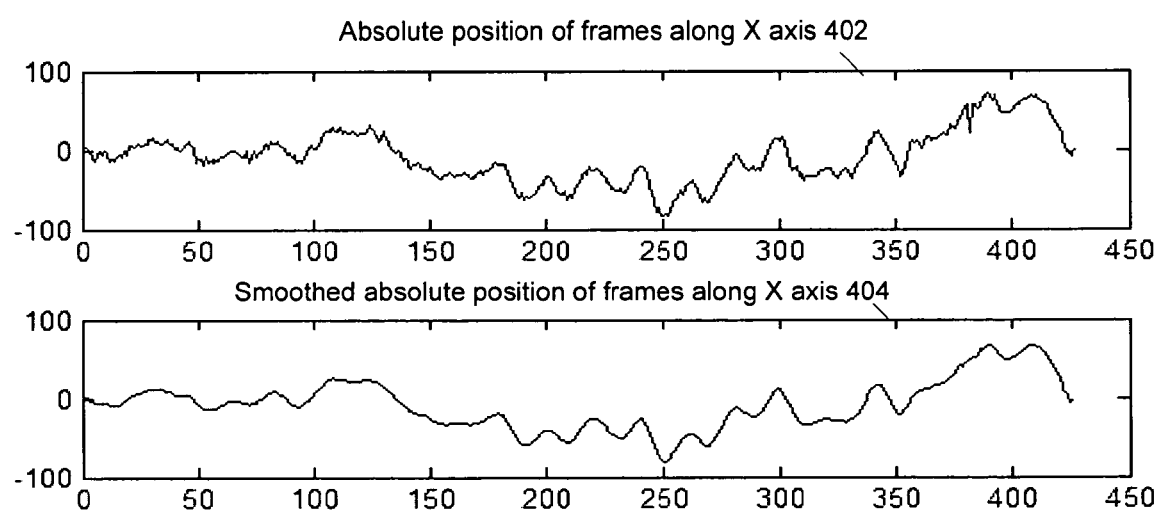
FIG. 4 depicts an example of smoothing of an absolute position of frames curve along the X axis after application of motion smoothing, in accordance with an embodiment of the present invention.

FIG. 4 depicts an example of smoothing of an absolute position of frames curve along the X axis after application of motion smoothing. Application of SG filtering on the data shown in plot 402 may produce the curve shown in plot 404. A smoother curve may reduce jitter in displayed video.

Figure 5:
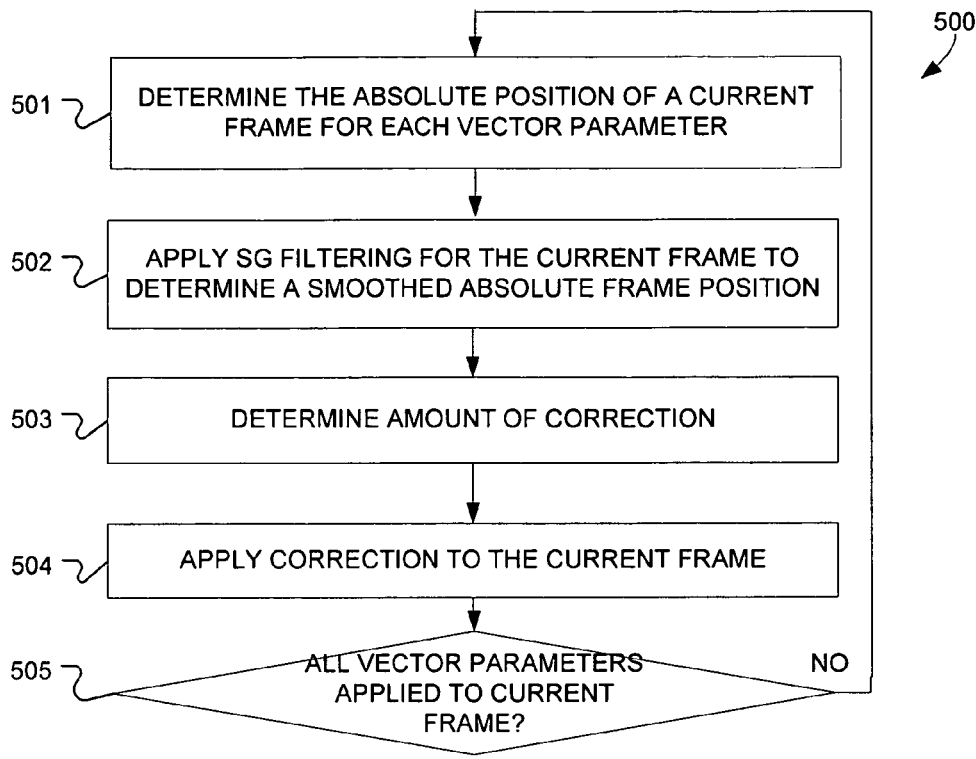
FIG. 5 depicts a process that can be used to smooth video, in accordance with an embodiment of the present invention.

FIG. 5 depicts a process 500 that can be used to smooth video, in accordance with an embodiment of the present invention. Block 501 may include determining the absolute position of a current frame relative to a previous frame for each vector parameter. The absolute position of the current frame may be equal to the absolute position of a previous frame plus an interframe motion vector parameter. Block 501 may include determining for a $V_i(t)$:

$$X(t)=X(t-1)+V_i(t), \text{ where}$$

X(t) represents the absolute position of the frame at time t and $V_i(t)$ represents a vector parameter of the motion estimation model at time t selected from among at least one parameter $V_1(t), V_2(t), \ldots, V_p(t)$.

Vector parameter $V_i(t)$ can be at least a vector parameter among vector parameters in a translation model (x and y parameters), translation and rotation model (x, y, and rotation parameters), or affine map (e.g., six parameters that preserve co-linearity between points and ratios of distance along a line).

Block 502 may include applying SG filtering for the current frame to determine a smoothed absolute frame position at time t. The current frame may be a frame X(t) determined in block 501 using at least one of the vector parameters. Block 502 may include determining $X_{SG}(t)$, a smoothed absolute frame position at time t, for the current frame:

$$X_{SG}(t) = \sum_{i=-n}^{n} c_i X(i), \text{ where}$$

$c_i$ are pre-calculated values for pre-selected k and n in a manner described in "Numerical Recipes in C: The Art of Scientific Computing," Press et al., pp. 650-655, Cambridge University Press (1992).

Using different polynomial order k and frame size n may result in different qualities of smoothness. Experiments on several videos revealed that using k=1, 2 and n=5±2 may produce good quality results.

Block 503 may include determining an amount of correction to apply. Block 503 may include determining the corrected parameter vector of the motion estimation model at time t to stabilize the video, $V_{corr}(t)$:

$$V_{corr}(t)=X_{SG}(t)-X(t).$$

Block 504 may include applying correction to the current frame. Block 504 may include applying an image warping scheme change the position of the frame but maintain the color. Block 504 may include determining the smoothed frame $I_{corr}(t)$ based on the absolute position of the original uncorrected frame at time t, I(t), using the parameters of the correction vector $V_{corr}(t)$. An image warping scheme may include mapping each pixel (a, b) in the current frame to a pixel (a', b') in the corrected frame image by using the following relationship:

$$(a',b')=M*(a,b),$$

where M is a transformation matrix that includes parameters of the correction vector, $V_{corr}(t)$.

For example, for a translation-rotation model, where the correction vector, $V_{corr}(t)$, includes variables m, n, and alpha, the matrix M may be:

cos(alpha), −sin(alpha), 0
sin(alpha), cos(alpha), 0
m, n, 1

As another example, image warping of each pixel may use the following relationship:

(a',b',1)=M*(a,b,1), where (a,b,1) is a representation of (a,b) in homogeneous coordinates.

Block 505 may include determining whether all parameters $V_i(t)$ of the interframe motion vector have been applied to the current frame. If all parameters of the interframe motion vector have not been applied to the current frame, then block 501 determines a current frame using an unused parameter $V_i(t)$. For example, in a first iteration of blocks 501-505, $V_i(t)$ may be x and then in a second iteration, $V_i(t)$ may be y.

Figure 6:
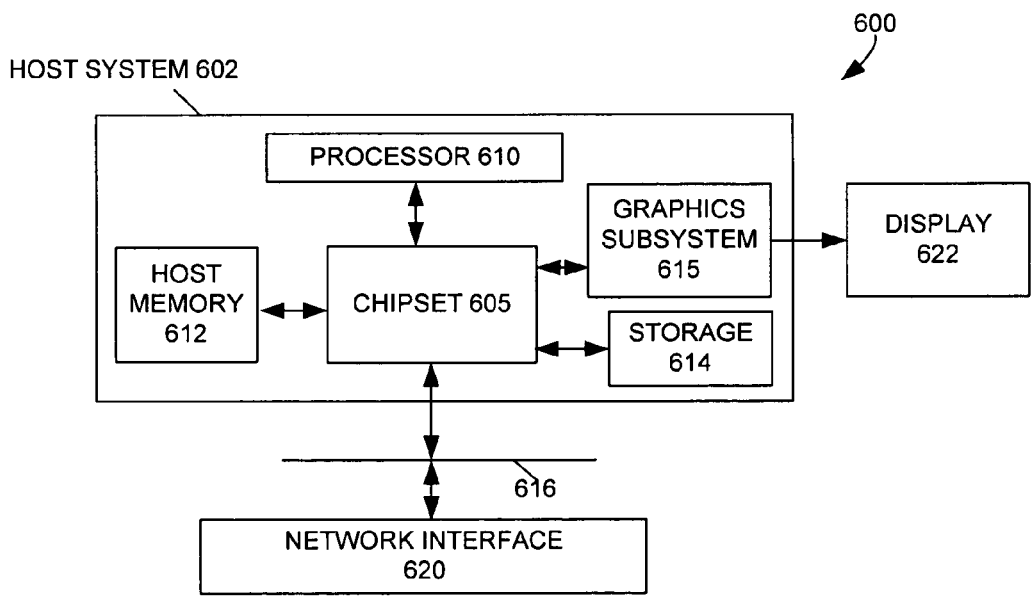
FIG. 6 depicts a high level block diagram of a computer system, in accordance with an embodiment of the present invention.

FIG. 6 depicts a block diagram of computer system 600, in accordance with an embodiment of the present invention. Computer system 600 may include host system 602, bus 616, and network interface 620. Host system 602 may include chipset 605, processor 610, host memory 612, storage 614, and graphics subsystem 615. Chipset 605 may provide intercommunication among processor 610, host memory 612, storage 614, graphics subsystem 615, and bus 616. For example, chipset 605 may include a storage adapter (not depicted) capable of providing intercommunication with storage 614. For example, the storage adapter may be capable of communicating with storage 614 in conformance with any of the following protocols: Small Computer Systems Interface (SCSI), Fibre Channel (FC), and/or Serial Advanced Technology Attachment (S-ATA).

In some embodiments, chipset 605 may include data mover logic capable of performing transfers of information within host memory 612, or between network interface 620 and host memory 612, or in general between any set of components in the computer system 600.

Processor 610 may be implemented as Complex Instruction Set Computer (CISC) or Reduced Instruction Set Computer (RISC) processors, multi-core, or any other microprocessor or central processing unit.

Host memory 612 may be implemented as a volatile memory device such as but not limited to a Random Access Memory (RAM), Dynamic Random Access Memory (DRAM), or Static RAM (SRAM). Storage 614 may be implemented as a non-volatile storage device such as but not limited to a magnetic disk drive, optical disk drive, tape drive, an internal storage device, an attached storage device, flash memory, battery backed-up SDRAM (synchronous DRAM), and/or a network accessible storage device.

Graphics subsystem 615 may perform processing of images such as still or video for display. For example, graphics subsystem 615 may reduce the jitter in video. In one embodiment, graphics subsystem 615 may use the techniques described with regard to FIG. 5 to reduce jitter.

Bus 616 may provide intercommunication among at least host system 602 and network interface 620 as well as other peripheral devices (not depicted). Bus 616 may support serial or parallel communications. Bus 616 may support node-to-node or node-to-multi-node communications. Bus 616 may at least be compatible with Peripheral Component Interconnect (PCI) described for example at Peripheral Component Interconnect (PCI) Local Bus Specification, Revision 3.0, Feb. 2, 2004 available from the PCI Special Interest Group, Portland, Oreg., U.S.A. (as well as revisions thereof); PCI Express described in The PCI Express Base Specification of the PCI Special Interest Group, Revision 1.0a (as well as revisions thereof); PCI-x described in the PCI-X Specification Rev. 1.1, Mar. 28, 2005, available from the aforesaid PCI Special Interest Group, Portland, Oreg., U.S.A. (as well as revisions thereof); and/or Universal Serial Bus (USB) (and related standards) as well as other interconnection standards.

Network interface 620 may be capable of providing intercommunication between host system 602 and a network in compliance with any applicable protocols. Network interface 620 may intercommunicate with host system 602 using bus 616. In one embodiment, network interface 620 may be integrated into chipset 605.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multicore processor. In a further embodiment, the functions may be implemented in a consumer electronics device.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A computer-implemented method comprising:
    receiving position information for a video frame, the position information indicating coordinates of a video frame at a specific time;
    applying Savitzky-Golay filtering on the position information using a computer; and
    providing filtered position information.

2. The method of claim 1, wherein the applying Savitzky-Golay filtering comprises:
    determining the absolute position of the frame relative to a previous frame using a vector parameter;
    applying Savitzky-Golay filtering on the frame to determine a smoothed absolute frame position;
    determining a correction vector; and
    applying correction to the frame based on the correction vector.

3. The method of claim 2, wherein the determining the absolute position of the frame relative to a previous frame using a vector parameter comprises determining:

$X(t) = X(t-1) + V_i(t)$, where

X(t) represents the absolute position of the frame at time t and $V_i(t)$ represents a vector parameter of the motion estimation model at time t selected from among at least one vector parameter.

4. The method of claim 3, wherein the at least one vector parameter is selected from a group consisting of: a translation model, a translation and rotation model, and an affine map.

5. The method of claim 3, wherein the applying Savitzky-Golay filtering on the frame to determine a smoothed absolute frame position comprises determining:

$$X_{SG}(t) = \sum_{i=-n}^{n} c_i X(i), \text{ where}$$

$X_{SG}(t)$ represents an Savitzky-Golay filtered absolute frame position value:

X(i) comprises an absolute position for the parameter vector $V_i(t)$ and $c_i$, are pre-calculated constants.

6. The method of claim 5, wherein determining the correction vector comprises determining $$V_{corr}(t) = X_{SG}(t) - X(t), \text{ wherein}$$

$V_{corr}(t)$ represents the correction vector.

7. The method of claim 6, wherein the applying correction to the frame comprises applying an image warping scheme to determine a smoothed frame based on an original frame at time t using the parameters of the correction vector $V_{corr}(t)$.

8. An apparatus comprising:
   logic to receive at least one specification of a video frame and
   motion smoothing logic to apply Savitzky-Golay filtering on the at least one video frame, wherein the at least one specification comprises coordinates of the frame at a specific time.

9. The apparatus of claim 8, wherein the motion smoothing logic is to:
   determine the absolute position of the frame relative to a previous frame using a vector parameter;
   apply Savitzky-Golay filtering on the frame to determine a smoothed absolute frame position;
   determine a correction vector; and
   apply correction to the frame based on the correction vector.

10. The apparatus of claim 9, wherein a vector parameter is selected from a group consisting of: a translation model, a translation and rotation model, and an affine map.

11. The apparatus of claim 9, wherein to apply correction to the frame, the motion smoothing logic is to apply image warping to pixels of the frame using the correction vector to modify a position of the frame.

12. A system comprising:
   a display device; and
   a processor to apply motion stabilization to video, wherein to apply motion stabilization, the processor is to:
      receive at least one specification of a video frame, the at least one specification indicating coordinates of the video frame at a specific time,
      apply Savitzky-Golay filtering on the at least one video frame based in part on the coordinates of the video frame at a specific time, and
      provide the filtered video frame to the display device.

13. The system of claim 12, wherein to apply Savitzky-Golay filtering, the processor is to:
   determine the absolute position of the frame relative to a previous frame using a vector parameter;
   apply Savitzky-Golay filtering on the frame to determine a smoothed absolute frame position;
   determine a correction vector; and
   apply correction to the frame based on the correction vector.

14. The system of claim 13, wherein a vector parameter is selected from a group consisting of: a translation model, a translation and rotation model, and an affine map.

15. The system of claim 13, wherein to apply correction to the frame, the processor is to apply image warping to pixels of the frame using the correction vector to modify a position of the frame.

\* \* \* \* \*